US009901999B2

(12) United States Patent
Lin et al.

(10) Patent No.: US 9,901,999 B2
(45) Date of Patent: Feb. 27, 2018

(54) RIP FENCE ADJUSTMENT STRUCTURE FOR SAW MACHINE

(71) Applicant: OAV EQUIPMENT & TOOLS, INC., Taichung (TW)

(72) Inventors: Chiu-Hsiang Lin, Taichung (TW); Kun-Feng Lin, Taichung (TW)

(73) Assignee: Oav Equipment & Tools, Inc., Taichung (TW)

( * ) Notice: Subject to any disclaimer, the term of this patent is extended or adjusted under 35 U.S.C. 154(b) by 0 days.

(21) Appl. No.: 15/420,527

(22) Filed: Jan. 31, 2017

(65) Prior Publication Data
US 2017/0216942 A1   Aug. 3, 2017

(30) Foreign Application Priority Data

Feb. 2, 2016   (TW) .............................. 105103278 A (51) Int. Cl.
*B23D 55/04*   (2006.01)
*B27B 27/02*   (2006.01)
*B27B 27/10*   (2006.01)

(52) U.S. Cl.
CPC .............. *B23D 55/04* (2013.01); *B27B 27/02* (2013.01); *B27B 27/10* (2013.01)

(58) Field of Classification Search
CPC ......... B23D 55/04; B27B 27/02; B27B 27/10; B27B 27/00; B27B 27/08; B26D 7/06; B26D 7/22; B23Q 3/007; Y10T 83/7647; Y10T 83/76; Y10T 83/7607; Y10T 83/727; Y10T 83/732; Y10T 83/773; B27C 5/04

USPC ........ 83/446, 462, 468.1, 468.7, 447.2, 438, 83/522.18, 522.19, 467; 144/253.1; 33/838, 831, 821, 813, 613
See application file for complete search history.

(56) References Cited

U.S. PATENT DOCUMENTS

| | | | | | |
|---|---|---|---|---|---|
| 2,325,082 | A | * | 7/1943 | Tautz ..................... | B23Q 3/005 83/438 |
| 2,806,493 | A | * | 9/1957 | Gaskell .................. | B23Q 3/005 144/253.1 |
| 2,852,049 | A | * | 9/1958 | Peterson .............. | B23Q 16/001 269/307 |
| 2,884,965 | A | * | 5/1959 | Stahl ...................... | B27B 25/10 33/640 |
| 4,986,323 | A | * | 1/1991 | Lemaire, Jr. ............ | B27B 27/02 144/253.1 |
| 5,460,070 | A | * | 10/1995 | Buskness ............... | B23Q 3/007 269/303 |

(Continued)

*Primary Examiner* — Ghassem Alie
(74) *Attorney, Agent, or Firm* — Muncy, Geissler, Olds & Lowe, P.C.

(57) ABSTRACT

A rip fence adjustment structure includes a guide rail, a first slide slidably coupled to the guide rail and fixedly connected with a rip fence, a micro-adjustment device mounted in the first slide, a second slide slidably coupled to the guide rail and connected to the first slide by the micro-adjustment device for movement with the first slide. Thus, after moved the first slide to achieve coarse adjustment of the position of the rip fence, a second locking member is fastened up to lock the second slide, and then the micro-adjustment device is operated to drive the first slide in moving the rip fence, and then a first locking member is fastened up to lock the first slide, achieving fine adjustment of the position of the rip fence.

7 Claims, 8 Drawing Sheets

(56) References Cited

U.S. PATENT DOCUMENTS

| | | | | |
|---|---|---|---|---|
| 2002/0108480 A1* | 8/2002 | Hewitt | .................... | B27B 27/02 83/446 |
| 2006/0248998 A1* | 11/2006 | Duginske | ............... | B23Q 3/007 83/468 |
| 2015/0306784 A1* | 10/2015 | Suhling | ................... | B27B 27/10 83/438 |

* cited by examiner

RIP FENCE ADJUSTMENT STRUCTURE FOR SAW MACHINE

BACKGROUND OF THE INVENTION

1. Field of the Invention

The present invention relates to saw machine technology, and more particularly to a rip fence adjustment structure used in a saw machine.

2. Description of the Related Art

In a saw machine (such as band saw), rip fence is a requisite part adapted for supporting a workpiece in position for linear cutting, avoiding deviation of the cutting path, enhancing the efficiency and stability of the cutting operation and maintaining optimal cutting precision.

In order to meet different application requirements, the position of the rip fence can be adjusted at any time for cutting different workpieces of different sizes. Generally, the rip fence is coupled with a handwheel by means of a screw joint. Rotating the handwheel causes movement of the rip fence linearly leftwards or rightwards. After reached the desired position, the rip fence is locked. However, for a long distance adjustment of the position of the rip fence, the user needs to rotate the handwheel continuously until the rip fence reaches the desired position. This adjustment manner is inconvenient, leading to low operational efficiency.

SUMMARY OF THE INVENTION

The present invention has been accomplished under the circumstances in view. It is the main object of the present invention to provide a rip fence adjustment structure for saw machine, which facilitates adjustment of the position of the rip fence and enhances the working efficiency of the rip fence in the cutting operation.

To achieve this and other objects of the present invention, a rip fence adjustment structure comprises a guide rail, a first slide unit, a second slide unit, and a micro-adjustment device. The guide rail is affixed to one side of a worktable of a saw machine. The first slide unit comprises a first slide mounted on and axially movable along the guide rail and fixedly connected with the rip fence, and a first locking member mounted in the first slide and adapted for locking the first slide to the guide rail. The first slide comprises a through hole located on one end thereof. The second slide unit comprises a second slide mounted on and axially movable along the guide rail and shielded by the first slide and a second locking member mounted in the second slide and adapted for locking the second slide to the guide rail. The second slide comprises an adjustment screw hole. The micro-adjustment device comprises a micro-adjustment screw bolt and a lock nut. The micro-adjustment screw bolt is rotatably inserted through the through hole of the first slide and threaded into the adjustment screw hole of the second slide, on the one hand, for allowing the second slide to be synchronously moved with the first slide before locking of the first and second locking members, and on the other hand, for driving the first slide to move along the guide rail for fine adjustment of the position of the rip fence after locking of the second slide to the guide rail. The lock nut is threaded onto the micro-adjustment screw bolt and stopped against one end of the first slide, ensuring rotation of the micro-adjustment screw bolt on its own axis.

Thus, the user can move the first slide to preliminarily adjust the position of the rip fence for coarse adjustment and then fasten up the second locking member to lock the second slide in position, thereafter, the user can operate the micro-adjustment device to move the first slide along the guide rail to achieve fine adjustment of the position of the rip fence. After fine adjustment of the position of the rip fence, fasten up the first locking member to lock the first slide in position. Thus, the position of the rip fence can be rapidly adjusted, enhancing operational efficiency.

Other advantages and features of the present invention will be fully understood by reference to the following specification in conjunction with the accompanying drawings, in which like reference signs denote like components of structure.

DETAILED DESCRIPTION OF THE INVENTION

Figure 1:
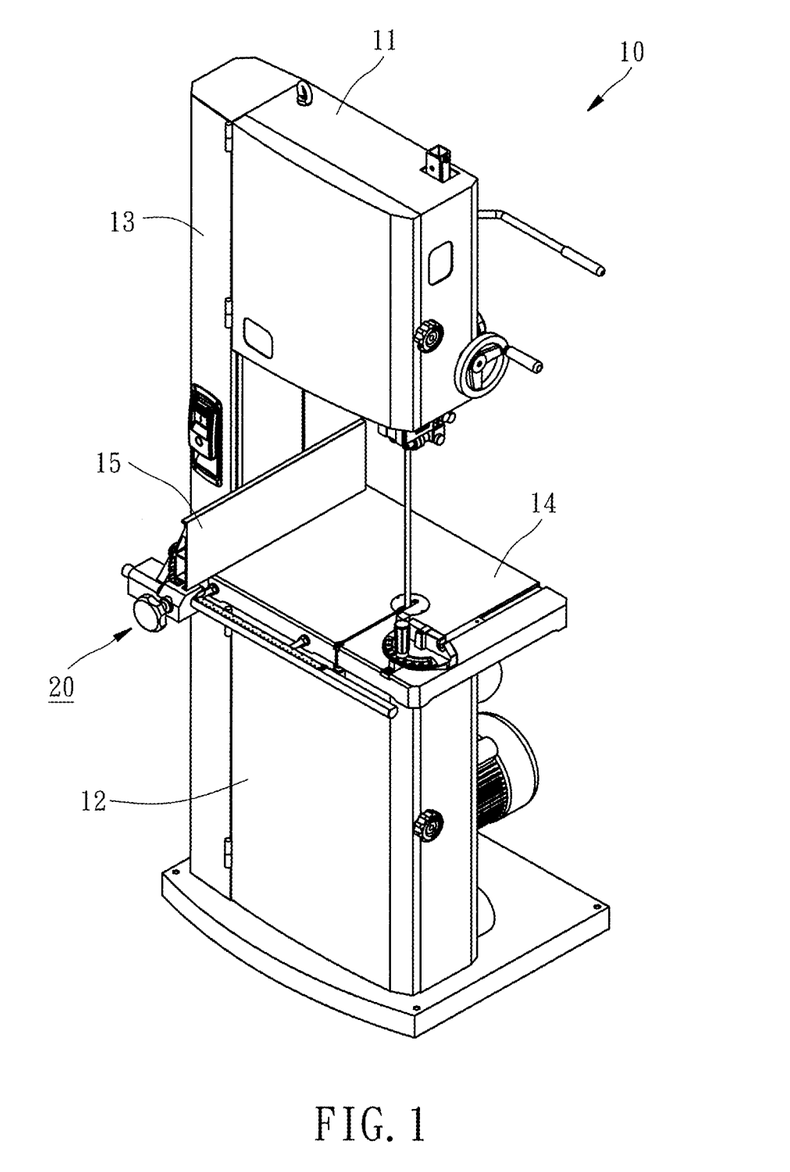
FIG. 1 is an oblique top elevational view of a saw machine using a rip fence adjustment structure in accordance with the present invention.

Referring to FIG. 1, a saw machine 10 using a rip fence adjustment structure 20 in accordance with the present invention is shown. The saw machine 10 comprises an upper machine housing 11, a lower machine housing 12, an upright support 13 connecting the upper machine housing 11 and the lower machine housing 12, a worktable 14 set between the upper machine housing 11 and the lower machine housing 12 for holding a workpiece (not shown) for cutting, and a rip fence 15 provided at a top surface of the worktable 14 for supporting the workpiece to be cut to enhance cutting stability. Because the saw machine 10 is of the known art, in order to save space, the applicant will not go into detail of its structure and principle of operation.

Figure 2:
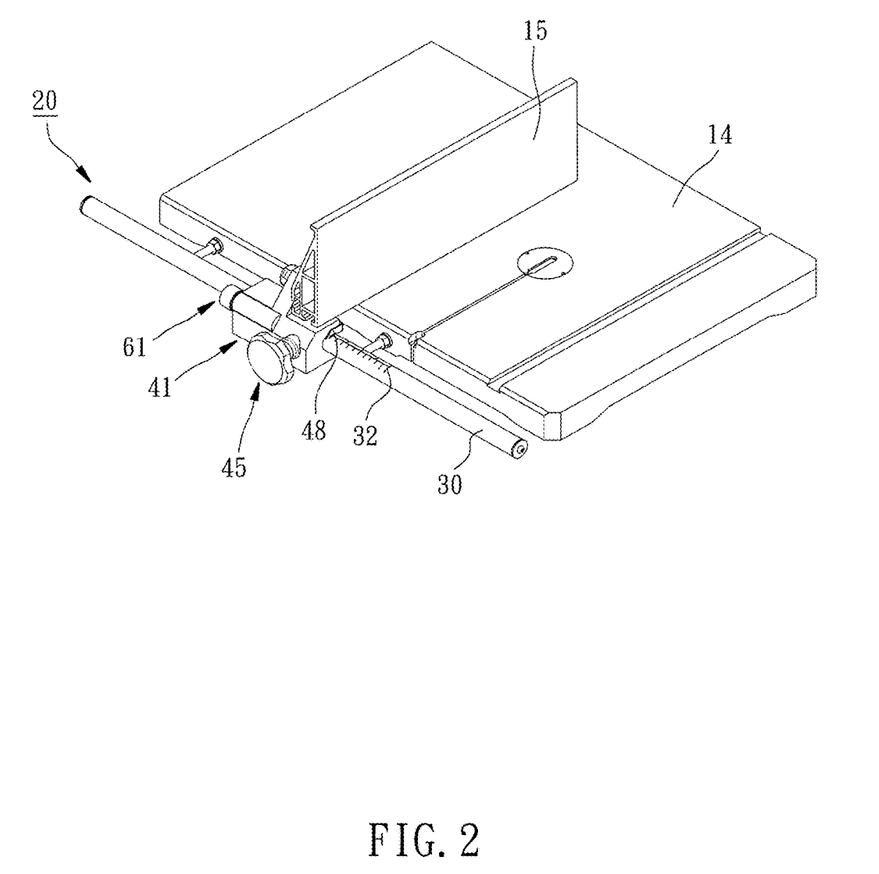
FIG. 2 is an oblique top elevational view of the rip fence adjustment structure in accordance with the present invention.
Figure 3:
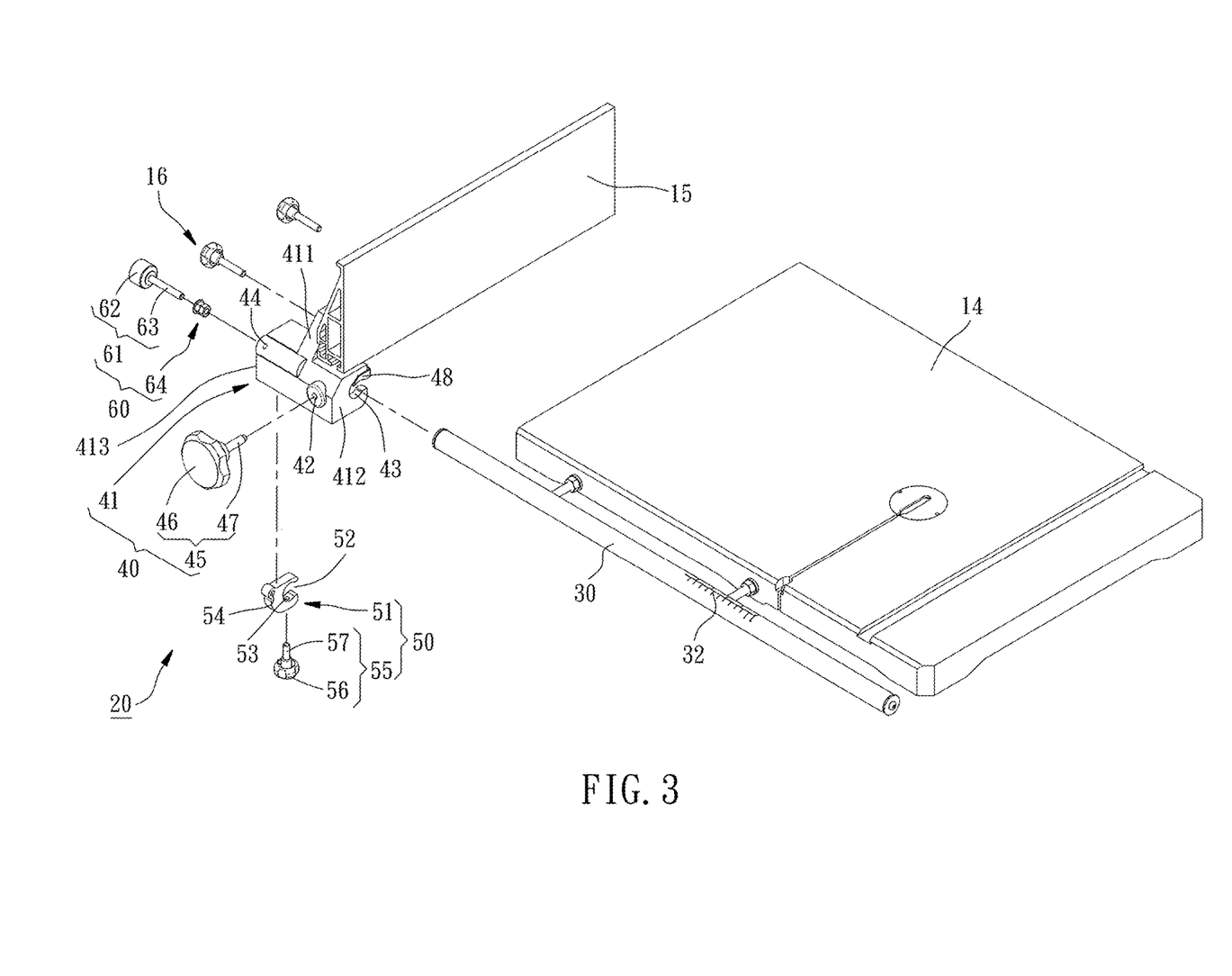
FIG. 3 is an exploded view of the rip fence adjustment structure in accordance with the present invention.

Referring also to FIGS. 2 and 3, the rip fence adjustment structure 20 comprises a guide rail 30, a first slide unit 40, a second slide unit 50, and a micro-adjustment device 60.

The guide rail 30 is affixed to a front side of the worktable 14, having scale graduations 32 marked thereon.

Figure 4:
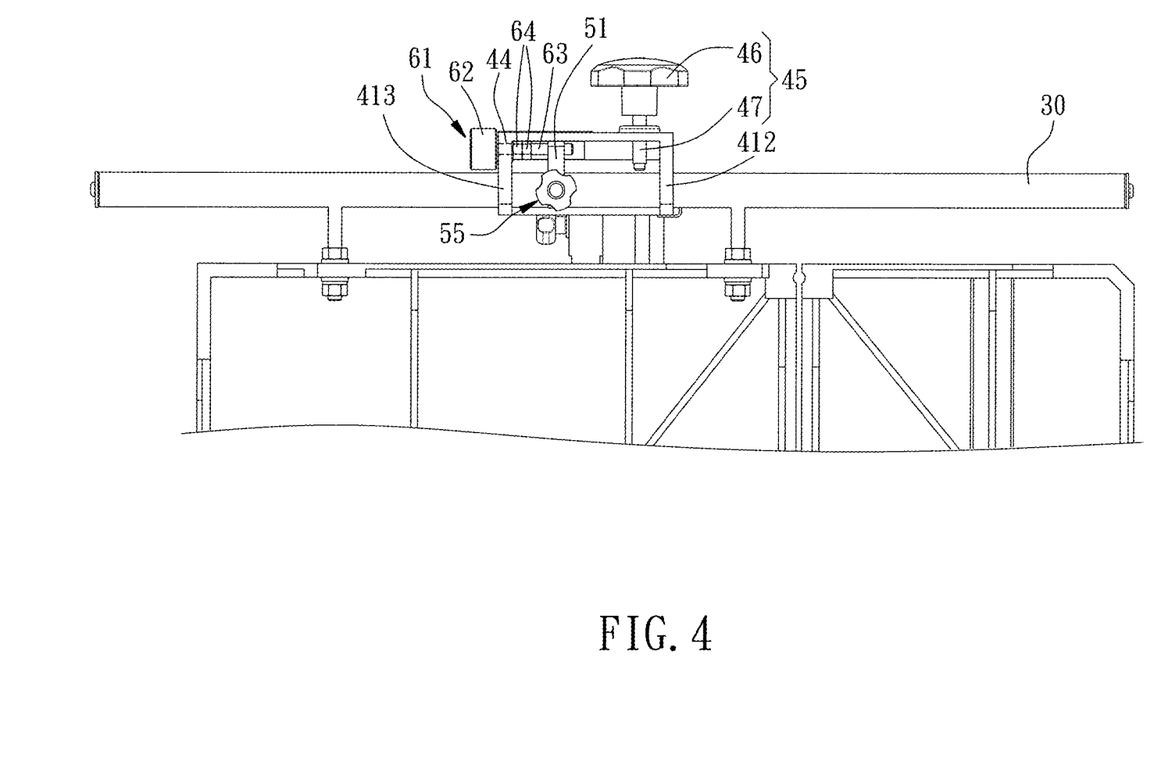
FIG. 4 is a sectional view of a part of the present invention, illustrating a status of the rip fence adjustment structure before locking of the first slide.
Figure 8:
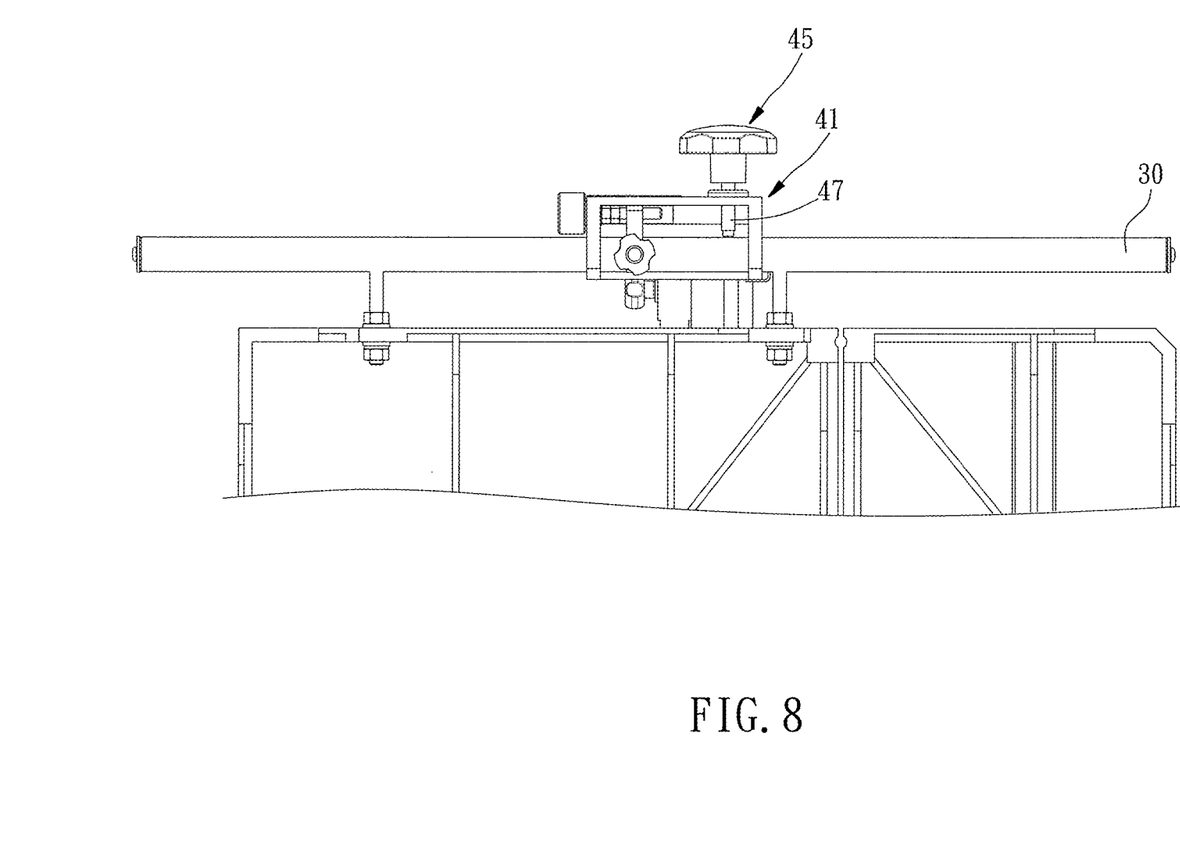
FIG. 8 is similar to FIG. 7, illustrating the first slide locked.

The first slide unit 40 comprises a first slide 41 and a first locking member 45. The first slide 41 comprises a first positioning screw hole 42 located on an outer wall thereof, a top wall 411 fixedly fastened to the rip fence 15 with a plurality of fastening members 16 (for example, screw bolts, as illustrated in FIG. 3), a front wall 412, a rear wall 413 opposite to the front wall 412, a first coupling groove 43 located in each of the front wall 412 and the rear wall 413 and coupled to the guide rail 30 for guiding the first slide 41 to move axially along the guide rail 30, and a through hole 44 located on the rear wall 413. Referring also to FIG. 4, the first locking member 45 comprises a first knob 46, and a first screw rod 47 extended from the first knob 46 and threaded into the first positioning screw hole 42 of the first slide 41. When fastened up the first locking member 45, as shown in FIG. 8, the end of the first screw rod 47 of the first locking member 45 is stopped against the surface of the guide rail 30, locking the first slide 41 to the guide rail 30. The first slide unit 40 further comprises an indicator 48 fixedly located on the front wall 412 of the first slide 41 and facing toward the scale graduations 32 of the guide rail 30 for enabling the user to visually check the moving distance of the rip fence 15 during an adjustment.

Figure 7:
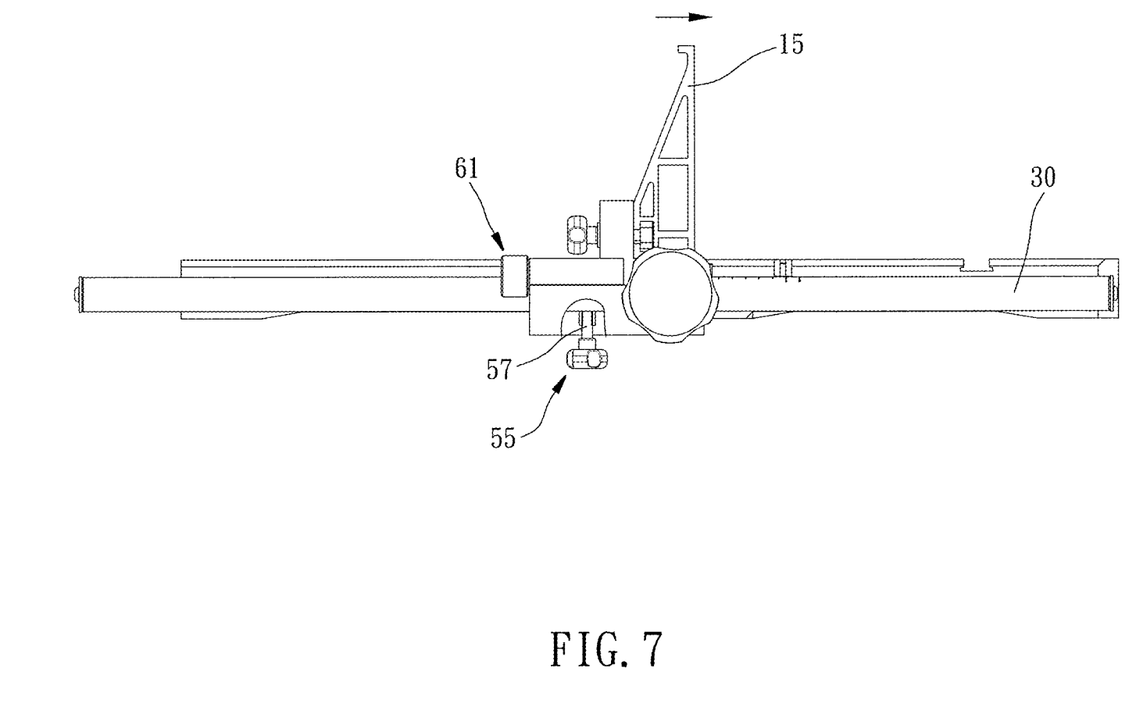
FIG. 7 is similar to FIG. 5, illustrating the second slide locked, the first slide moved along the guide rail.

The second slide unit 50 comprises a second slide 51 and a second locking member 55. As illustrated in FIGS. 3 and 4, the second slide 51 is disposed between the front wall 412 and rear wall 413 of the first slide 41 and shielded by the first slide 41. The second slide 51 comprises a second coupling groove 52 coupled to the guide rail 30 for guiding the second slide 51 to move axially along the guide rail 30, a second positioning screw hole 53 located on a bottom wall thereof in communication with the second coupling groove 52, and an adjustment screw hole 54 located on a sidewall thereof corresponding to the through hole 44 of the first slide 41. As illustrated in FIGS. 3 and 4, the second locking member 55 comprises a second knob 56, and a second screw rod 57 extended from the second knob 56 and threaded into the second positioning screw hole 53 of the second slide 51. When fastened up the second locking member 55, as shown in FIG. 7, the end of the second screw rod 57 is stopped against the surface of the guide rail 30, locking the second slide 51 to the guide rail 30.

The micro-adjustment device 60 comprises a micro-adjustment screw bolt 61 and two lock nuts 64. The micro-adjustment screw bolt 61 comprises a head 62 and a threaded shank 63. The head 62 is stopped at an outer surface of the rear wall 413 of the first slide 41. The threaded shank 63 is inserted through the through hole 44 of the first slide 41 and threaded into the adjustment screw hole 54 of the second slide 51, for allowing the second slide 51 to be synchronously moved with the first slide 41 before locking of the first and second locking members 45,55. The lock nuts 64 are respectively threaded onto the threaded shank 63 of the micro-adjustment screw bolt 61 and closely attached to each other in a parallel manner with one lock nut 64 abutted against an inner surface of the rear wall 413 of the first slide 41, ensuring rotation of the threaded shank 63 of the micro-adjustment screw bolt 61 on its own axis in the through hole 44.

Figure 5:
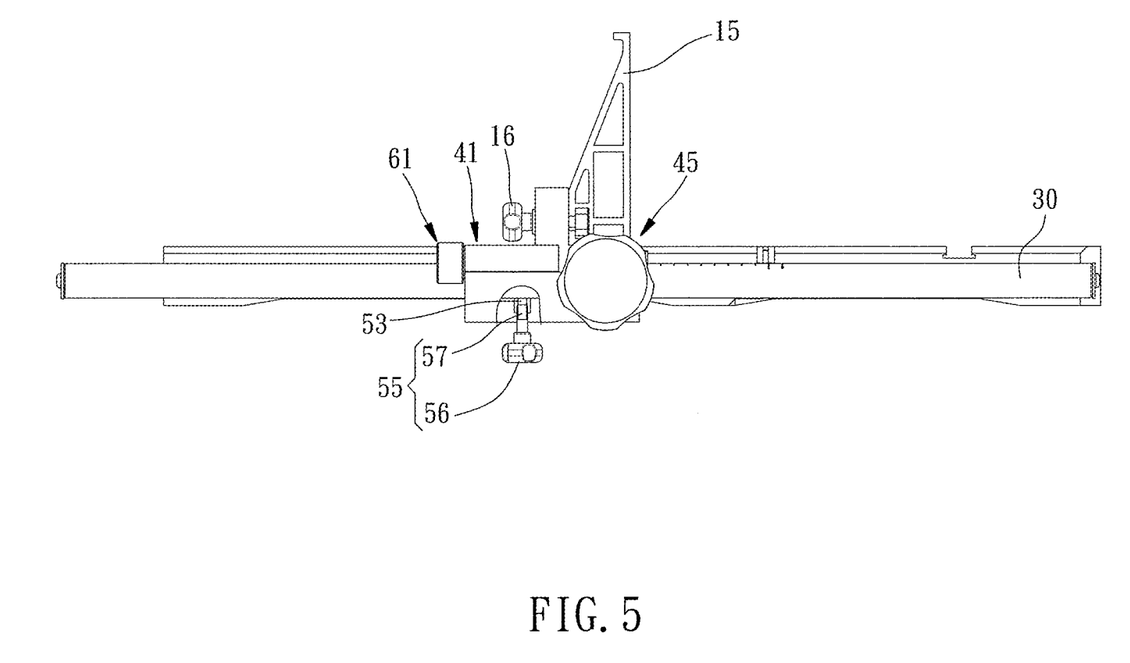
FIG. 5 is a sectional view of a part of the present invention, illustrating a status of the rip fence adjustment structure before locking of the second slide.
Figure 6:
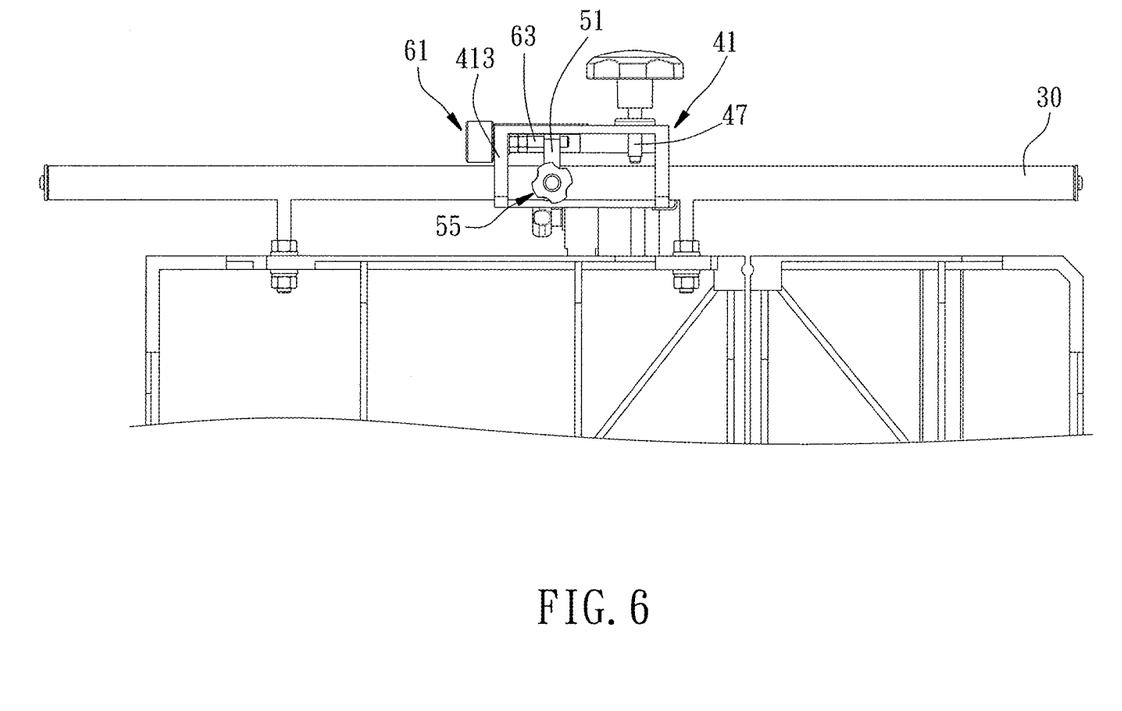
FIG. 6 is similar to FIG. 4, illustrating the second slide locked, the first slide moved along the guide rail.

When wishing to adjust the position of the rip fence 15, as shown in FIGS. 4 and 5, loosen the first and second locking members 45,55 at first, and then use the first slide 41 to preliminarily adjust the position of the rip fence 15. When moving the first slide 41 along the guide rail 30, the micro-adjustment screw bolt 61 carries the second slide 51 to move with the first slide 41. After preliminary adjustment of the position of the rip fence 15, as illustrated in FIGS. 6 and 7, fasten up the second locking member 55 to lock the second slide 51 in position, and then rotate the micro-adjustment screw bolt 61. When rotating the micro-adjustment screw bolt 61, the second slide 51 is maintained immovable, thus, subject to the threaded connection relationship between the micro-adjustment screw bolt 61 and the second slide 51, the micro-adjustment screw bolt 61 is forced to push the rear wall 413 of the first slide 41 as the micro-adjustment screw bolt 61 is being rotated, thereby moving the first slide 41 and the rip fence 15 axially along the guide rail 30 for micro adjustment. At this time, the user can use the indicator 48 and the scale graduations 32 of the guide rail 30 to visually check accurate positioning of the rip fence 15. As soon as the rip fence 15 has positioned in the desired position, as illustrated in FIG. 8, fasten up the first locking member 45 to lock the first slide 41, finishing the adjustment of the position of the rip fence 15.

In conclusion, the rip fence adjustment structure 20 allows the user to adjust the position of the rip fence 15 in a two-stage adjustment manner. At the first stage, adjust the position of the rip fence 15 in a coarse adjustment manner, and then fasten up the second locking member 55. After coarse adjustment, the first slide 41 can still be continuously moved while the second slide 51 is locked. At the second stage, adjust the position of the rip fence 15 in a fine adjustment manner, and then fasten up the first locking member 45 to lock the first slide 41, thereby finishing the position adjustment of the rip fence 15. When compared with the prior art techniques, the invention greatly shortens the adjustment time, enhancing operational efficiency and providing high structural stability.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A rip fence adjustment structure used in a saw machine comprising a worktable and a rip fence mounted on a top surface of said worktable, the rip fence adjustment structure comprising:
    a guide rail affixed to one side of said worktable;
    a first slide unit comprising a first slide mounted on and axially movable along said guide rail and fixedly connected with said rip fence and a first locking member mounted in said first slide and adapted for locking said first slide to said guide rail, said first slide comprising a through hole located on one end thereof;
    a second slide unit comprising a second slide mounted on and axially movable along said guide rail and shielded by said first slide and a second locking member mounted in said second slide and adapted for locking said second slide to said guide rail, said second slide comprising an adjustment screw hole; and
    a micro-adjustment device comprising a micro-adjustment screw bolt rotatably inserted through said through hole of said first slide and threaded into said adjustment screw hole of said second slide for driving said first slide to move along said guide rail after locking of the second slide to the guide rail, and at least one lock nut threaded onto said micro-adjustment screw bolt and stopped against one end of said first slide.

2. The rip fence adjustment structure as claimed in claim 1, wherein said first slide comprises a first positioning screw hole; said first locking member comprises a first knob, and a first screw rod extended from said first knob and threaded into said first positioning screw hole of said first slide for separately stopping against an outer surface of said guide rail with a distal end thereof to lock said first slide to said guide rail.

3. The rip fence adjustment structure as claimed in claim 1, wherein said second slide comprises a second positioning screw hole; said second locking member comprises a second knob, and a second screw rod extended from said second knob and threaded into said second positioning screw hole for separately stopping against an outer surface of said guide rail with a distal end thereof to lock said second slide to said guide rail.

4. The rip fence adjustment structure as claimed in claim 1, wherein said first slide comprises a front wall and an opposing rear wall, said rear wall having said through hole defined therein; said micro-adjustment screw bolt comprises a head stopped at an outer surface of said rear wall of said first slide and a threaded shank extended from said head and rotatably inserted through said through hole of said first slide and threaded into said adjustment screw hole of said second slide; said at least one lock nut is threaded onto said threaded shank of said micro-adjustment screw bolt and stopped against an inner surface of said rear wall of said first slide.

5. The rip fence adjustment structure as claimed in claim 1, wherein said guide rail comprises a plurality of scale graduations on an outer surface thereof; said first slide comprises a front wall and a rear wall opposite to said front wall, said rear wall having said through hole defined therein; said second slide is disposed between said front wall and said rear wall of said first slide; said first slide unit further comprises an indicator located on said front wall of said first slide for pointing out said scale graduation.

6. The rip fence adjustment structure as claimed in claim 1, wherein said first slide comprises a front wall, a rear wall opposite to said front wall, a first coupling groove defined in each of said front wall and said rear wall and axially slidably coupled to said guide rail.

7. The rip fence adjustment structure as claimed in claim 1, wherein said second slide comprises a second coupling groove axially slidably coupled to said guide rail.

* * * * *